(12) United States Patent
Mathias et al.

(10) Patent No.: US 10,639,584 B2
(45) Date of Patent: May 5, 2020

(54) METHODS AND SYSTEMS FOR IMPROVING THE ENERGY EFFICIENCY OF CARBON DIOXIDE CAPTURE

(71) Applicant: Fluor Technologies Corporation, Sugar Land, TX (US)

(72) Inventors: Paul M. Mathias, Aliso Viejo, CA (US); Satish Reddy, Laguna Beach, CA (US); Joseph Yonkoski, Irvine, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 0 days.

(21) Appl. No.: 16/460,052

(22) Filed: Jul. 2, 2019

(65) Prior Publication Data
US 2019/0321773 A1    Oct. 24, 2019

Related U.S. Application Data

(62) Division of application No. 15/621,889, filed on Jun. 13, 2017, now Pat. No. 10,376,829.

(51) Int. Cl.
*B01D 53/14* (2006.01)

(52) U.S. Cl.
CPC ..... *B01D 53/1475* (2013.01); *B01D 53/1425* (2013.01); *B01D 53/1493* (2013.01);
(Continued)

(58) Field of Classification Search
None
See application file for complete search history.

(56) References Cited

U.S. PATENT DOCUMENTS

| 4,101,633 A | 7/1978 | Sartori et al. |
| 4,142,217 A | 2/1979 | Laufer |

(Continued)

FOREIGN PATENT DOCUMENTS

| CA | 2760784 A1 | 10/2010 |
| EP | 2792399 A1 | 10/2014 |

(Continued)

OTHER PUBLICATIONS

Office Action dated Jun. 14, 2017, U.S. Appl. No. 15/008,964, filed on Jan. 28, 2016.
(Continued)

*Primary Examiner* — Tam M Nguyen
(74) *Attorney, Agent, or Firm* — Conley Rose, PC

(57) ABSTRACT

A system for carbon dioxide capture from a gas mixture comprises a lean solvent comprising 3-amino-1-propanol (AP), 2-dimethylamino-2-methyl-1-propanol (DMAMP), and water; an absorber containing at least a portion of the lean solvent, wherein the absorber is configured to receive the lean solvent and a gaseous stream comprising carbon dioxide, contact the lean solvent with the gaseous stream, and produce a rich solvent stream and a gaseous stream depleted in carbon dioxide; a stripper, wherein the stripper is configured to receive the rich solvent stream; a cross-exchanger fluidly coupled to a rich solvent outlet on the absorber and a rich solvent inlet on the stripper; a reboiler fluidly coupled to a lower portion of the stripper; and a condenser fluidly coupled to a vapor outlet of the stripper.

20 Claims, 2 Drawing Sheets

(52) U.S. Cl.
CPC .......... B01D 2252/202 (2013.01); B01D 2252/20405 (2013.01); B01D 2252/20421 (2013.01); B01D 2252/20431 (2013.01); B01D 2252/20484 (2013.01); B01D 2252/504 (2013.01); B01D 2258/0283 (2013.01)

(56) References Cited

U.S. PATENT DOCUMENTS

| | | | |
|---|---|---|---|
| 4,152,217 | A | 5/1979 | Eisenberg et al. |
| 4,160,810 | A | 7/1979 | Benson et al. |
| 4,702,898 | A | 10/1987 | Grover |
| 5,609,840 | A | 3/1997 | Mimura et al. |
| 5,618,506 | A * | 4/1997 | Suzuki .......... B01D 53/1475 423/228 |
| 5,700,437 | A | 12/1997 | Fujii et al. |
| 5,738,834 | A | 4/1998 | Deberry |
| 8,080,089 | B1 | 12/2011 | Wen et al. |
| 8,906,149 | B1 | 12/2014 | Baburao et al. |
| 9,399,192 | B2 | 7/2016 | Fujimoto et al. |
| 10,005,027 | B2 | 6/2018 | Mathias et al. |
| 2005/0166756 | A1 | 8/2005 | Brok et al. |
| 2006/0032377 | A1 | 2/2006 | Reddy et al. |
| 2010/0062926 | A1 | 3/2010 | Woodhouse et al. |
| 2010/0092359 | A1 | 4/2010 | Svendsen et al. |
| 2010/0132563 | A1 | 6/2010 | Pan et al. |
| 2010/0226841 | A1 | 9/2010 | Thiele et al. |
| 2010/0263534 | A1 | 10/2010 | Chuang |
| 2012/0061613 | A1 | 3/2012 | Heldebrant et al. |
| 2012/0090466 | A1 | 4/2012 | Versteeg et al. |
| 2014/0127119 | A1 | 5/2014 | Fujimoto et al. |
| 2014/0241967 | A1 | 8/2014 | Fujita et al. |
| 2014/0363347 | A1 | 12/2014 | Baburao et al. |
| 2015/0147254 | A1 | 5/2015 | Weiss et al. |
| 2015/0306538 | A1 * | 10/2015 | Hoff .......... B01D 53/1475 423/228 |
| 2016/0214057 | A1 | 7/2016 | Mathias et al. |
| 2018/0264404 | A1 | 9/2018 | Mathias et al. |
| 2018/0353896 | A1 | 12/2018 | Mathias et al. |

FOREIGN PATENT DOCUMENTS

| | | |
|---|---|---|
| EP | 3250311 A1 | 12/2017 |
| FR | 2909010 A1 | 5/2008 |
| JP | 2012504047 A | 2/2012 |
| WO | 2011147033 A2 | 12/2011 |
| WO | 2012092191 A2 | 7/2012 |
| WO | 2014077919 A1 | 5/2014 |
| WO | 2014098154 A1 | 6/2014 |
| WO | 2014118633 A2 | 8/2014 |
| WO | 2016123386 A1 | 8/2016 |
| WO | 2018231814 A1 | 12/2018 |

OTHER PUBLICATIONS

Notice of Allowance dated Feb. 16, 2018, U.S. Appl. No. 15/008,964, filed on Jan. 28, 2016.
Restriction Requirement dated Jan. 11, 2019, U.S. Appl. No. 15/621,889, filed on Jun. 13, 2017.
Notice of Allowance dated Mar. 27, 2019, U.S. Appl. No. 15/621,889, filed on Jun. 13, 2017.
Foreign Communication from a Related Counterpart—International Search Report and Written Opinion, dated May 19, 2016, PCT/US2016/015439, filed on Jan. 28, 2016.
Foreign Communication from a Related Counterpart—International Preliminary Report on Patentability, dated Aug. 10, 2017, PCT/US2016/015439, filed on Jan. 28, 2016.
Foreign Communication from a Related Counterpart—International Search Report and Written Opinion, dated Sep. 17, 2018, PCT/US2018/37085, filed on Jun. 12, 2018.
Communication Pursuant to Rule 164(1) EPC dated Sep. 14, 2018, European Patent Application No. 116744135.1, filed Jul. 27, 2017.
Communication Pursuant to Rules 70(2) and 70a(2) EPC dated Jan. 31, 2019, European Patent Application No. 116744135.1, filed Jul. 27, 2017.
Bao, D et al., "Numerical simulations of bubble behavior and mass transfer in CO2 capture system with ionic liquids", Chem. Eng. Sci., 2015, 13 pages, http://dx.doi.org/10.1016/j_ces.2015.06.035i.
Huang, Y. et al., "A New Fragment Contribution-Corresponding States Method for Physicochemical Properties Prediction of Ionic Liquids", AIChE Journal, Apr. 2013, vol. 59, No. 4, pp. 1348-1359.
Leites, I.L., "Thermodynamics of CO2 Solubility in Mixtures Monoethanolamine With Organic Solvents and Water and Commerical Experience of Energy Saving Gas Purification of Technology", Energy Conversion and Management, Elsevier Science Publishers, Oxford, GB, vol. 39, No. 16-18, Nov. 1, 1998, pp. 1665-1674.
Lin, Po-Han et al, "Carbon Dioxide Capture and Regeneration With Amine/Alcohol/Water Blends", International Journal of Greenhouse Gas Contraol, Amsterdam, NL, vol. 26, May 13, 2014, pp. 69-75.
Zhang, X.P. et al., "Carbon capture with ionic liquids: overview and progress", Energy Environ. Sci., 2012. 5: pp. 6668-6681.
Mathias, Paul M., et al. "Methods and Compositions to Improve the Energy Efficiency of Carbon Dioxide Capture by Chemical Solvents," U.S. Appl. No. 62/108,926, filed on Jan. 28, 2015.

* cited by examiner

METHODS AND SYSTEMS FOR IMPROVING THE ENERGY EFFICIENCY OF CARBON DIOXIDE CAPTURE

CROSS-REFERENCE TO RELATED APPLICATIONS

This application is a divisional of U.S. patent application Ser. No. 15/621,889 filed on Jun. 13, 2017, which is incorporated by reference herein in its entirety.

BACKGROUND

Carbon dioxide ($CO_2$) is a greenhouse gas that, as a byproduct of combustion and a wide variety of industrial processes, is subject to increasing regulation. As a result, there is a significant interest in efficient methods for capture $CO_2$ from such gas mixtures. Such methods are often designed to capture $CO_2$ at low pressure (for example, from flue gas), and typically are energy intensive. In traditional processes, an aqueous chemical solvent (typically an aqueous solution of MEA, AMP, and/or piperazine) is utilized in an absorber to absorb $CO_2$ in the form of chemical complexes with the solvent species and water, generating a rich solvent. A stripper is utilized to release $CO_2$ from the rich solvent through the application of heat, to produce a lean solvent. In such processes a cross exchanger is utilized to improve efficiency by exchanging heat from the lean solvent into the rich solvent. The net heat that is added to the process is referred to as the stripper duty or energy consumption. This energy consumption not only represents a considerable expense, the production of the necessary heat (for example, steam production) can result in the generation of additional $CO_2$ and/or reduction of the output (for example, electricity) of the plant.

SUMMARY

In an embodiment, a solvent for capture of carbon dioxide from a gas mixture may comprise 3-amino-1-propanol (AP), in a concentration ranging from 5 wt % to 45 wt %; 2-dimethylamino-2-methyl-1-propanol (DMAMP), where a mass ratio of DMAMP to AP is between about 1:11 and 5:1; and water.

In an embodiment, a method for capturing carbon dioxide from a gas mixture may comprise contacting a gaseous stream comprising carbon dioxide with a lean solvent, wherein the lean solvent comprises AP, DMAMP, and water; absorbing at least a portion of the carbon dioxide in the lean solvent to produce a rich solvent; transferring the rich solvent to a stripper, wherein the stripper comprises a reboiler; applying heat to the rich solvent using the reboiler; generating a vapor stream within the reboiler while incurring an energy consumption to regenerate the lean solvent, wherein the vapor stream comprises steam and at least a portion of the carbon dioxide from the rich solvent; and transferring the vapor stream to a condenser.

In an embodiment, a system for carbon dioxide capture from a gas mixture may comprise a lean solvent comprising AP, DMAMP, and water; an absorber containing at least a portion of the lean solvent, wherein the absorber is configured to receive the lean solvent and a gaseous stream comprising carbon dioxide, contact the lean solvent with the gaseous stream, and produce a rich solvent stream and a gaseous stream depleted in carbon dioxide; a stripper, wherein the stripper is configured to receive the rich solvent stream; a cross-exchanger fluidly coupled to a rich solvent outlet on the absorber and a rich solvent inlet on the stripper; a reboiler fluidly coupled to a lower portion of the stripper, wherein the reboiler is configured to generate a vapor stream from the rich solvent and pass the vapor stream back to the stripper; and a condenser fluidly coupled to a vapor outlet of the stripper.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
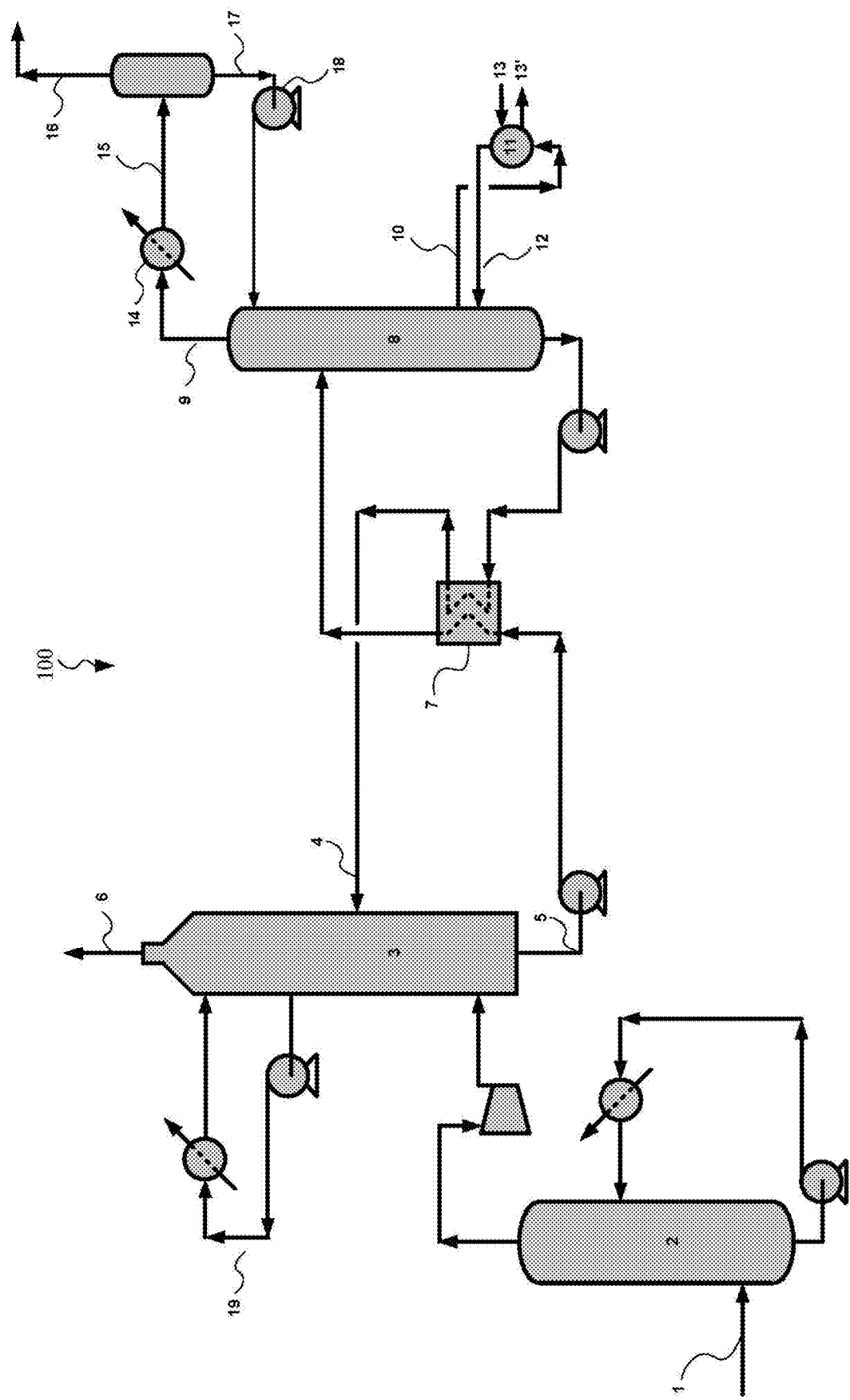
FIG. 1 is a schematic illustration of an embodiment of a carbon dioxide capture system according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Disclosed herein are apparatus, systems, and methods for the use of a specific acid gas solvent to reduce the total energy consumption of an absorption-stripping process utilized in the capture of carbon dioxide. In general, the solvent can include AP, DMAMP, and water. Surprisingly, the use of the specific solvent can reduce the overall energy consumption of the system relative to the energy consumption associated with pure component solvents having only AP or DMAMP. Thus, the present disclosure provides an improved solvent that has reduced total energy consumption for the absorption-stripping process.

In addition to the reduction in energy consumption, the use of the solvent described herein can help to reduce the degradation of the solvent over time. This may help to reduce the amount of makeup solvent needed in a system as well as reducing the need for solvent reclamation systems.

Various objects, features, aspects and advantages of the inventive subject matter will become more apparent from the following detailed description of preferred embodiments, along with the accompanying drawing figures in which like numerals represent like components. The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural references unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from a group for reasons of convenience and/or patentability. When any such inclusion or deletion occurs, the specification is herein deemed to contain the group as modified thus fulfilling the written description of all Markush groups used in the appended claims.

As discussed herein, the energy consumption in a carbon dioxide capture process can be reduced using a solvent. In an embodiment, the energy consumption of the carbon dioxide capture process can be reduced relative to conventional chemical solvents and solvents through the specific combination of AP and DMAMP.

The solvent can be used in a carbon dioxide capture system. In an embodiment, a carbon dioxide system can generally comprise an absorber for contacting a lean solvent with a flue gas to absorb carbon dioxide. The rich solvent can then pass to a stripper where the carbon dioxide can be released from the rich solvent to regenerate the lean solvent.

The solvent described herein can result in an absorption process having reduced energy consumption. In general, there are three primary contributors to the total energy consumption within a carbon dioxide capture process. The first is the heat required to release $CO_2$ from the rich solvent. This heat is supplied to reverse the carbon dioxide absorption reaction with the chemical solvent and is strongly related to the heat of absorption of carbon dioxide. A second contributor to the total energy consumption is heat loss by the system (for example, heat losses due to finite temperature approaches in the cross exchanger, etc.). This can be reduced by proper system design. A third contributor to the total energy consumption is the heat of vaporization related to creating steam in the stripper in order to strip carbon dioxide from the rich solvent.

In an embodiment, the solvent used in the carbon dioxide capture system or process can comprise AP, DMAMP, and water. DMAMP, being a sterically hindered amine, is known to have low energy requirement for regeneration of the absorbent but the slow reaction kinetics have a negative impact in the absorber as it requires a longer contact time between the $CO_2$ containing gas and the absorbent in the absorber. It is believed, and without being limited by theory, that the use of DMAMP in the solvent, in certain conditions and compositions disclosed herein, reduces the likelihood that the solvent will precipitate a solid with $CO_2$, in contrast to other common compounds that may be used in the solvent. Therefore DMAMP may be combined with AP, which is known to have high energy requirement.

According to the present embodiments, it is found that an aqueous $CO_2$ absorbent comprising from approximately 5% to 55% by weight of DMAMP and from approximately 5% to 45% by weight of AP shows good reaction kinetics, absorption capacity, and low energy requirement. Additionally, utilizing the combination of DMAMP and AP results in an unexpected decrease in the energy consumption of the overall system and an unexpectedly high reaction rate.

The amount of the DMAMP utilized in the solvent can be expressed in terms of a molar ratio relative to the amount of the AP utilized in the solvent. In an embodiment, a molar ratio of the DMAMP to AP can be at least about 0.05, at least about 0.1, or at least about 0.15. In an embodiment, a molar ratio of DMAMP to AP can be less than about 7.5, less than about 7.0, or less than about 6.5. In some embodiments, the molar ratio of DMAMP to AP can be in a range between any of the lower values to any of the upper values.

The balance of the solvent can include water. In some embodiments, the solvent can comprise between about 1% and about 75% water. It should be noted that within a carbon dioxide system, the solvent can absorb water from a flue gas, and therefore the amount of water at any point within the solvent in the system can vary. When discussed with respect to a carbon dioxide removal system, the solvent compositions described herein generally refer to the composition of the solvent in the lean solvent. For example, the solvent composition as described herein can be taken as the solvent composition at or immediately upstream of the solvent feed to the absorber.

In an embodiment, the use of the solvent described herein can be used in a carbon dioxide absorption process. A process flowsheet of an embodiment of a $CO_2$ absorption system 100 is shown in FIG. 1. Exhaust gas (i.e. flue gas, carbonaceous gas, or gas containing $CO_2$) may be generated by a combustion process of carbonaceous fuels and introduced through an exhaust pipe 1. The exhaust gas in the exhaust pipe 1 is introduced into a direct contact cooler 2 where the exhaust gas is washed and cooled by a countercurrent flow of water. The cooled exhaust gas is then introduced into an absorber 3. A lean solvent can pass through lean absorbent pipe 4 into an upper portion of the absorber 3. The absorber 3 can comprise a distributor that evenly passes the solvent over a packing or other internal structure (e.g., plates, trays, etc.) within the absorber to provide gas-liquid contact between the flue gas rising within the absorber 3 and the liquid solvent flowing down through the absorber 3. Within the absorber 3, the carbon dioxide within the exhaust gas can be absorbed within the solvent such that the amount of carbon dioxide within the solvent can increase as the solvent flows from the upper portion to the lower portion of the absorber 3.

The rich solvent containing the absorbed $CO_2$ can pass out of the absorber 3 through rich solvent line 5. In addition to the carbon dioxide, some amount of water from the water vapor in the flue gas can be absorbed in the solvent within the absorber 3. The water can partially dilute the solvent in the rich solvent stream. The $CO_2$ lean exhaust gas may be released into the surroundings through lean exhaust pipe 6 after being washed in a washing section by means of water recycled through washing water cooling circuits 19.

The rich absorbent in pipe 5 is heated against the lean absorbent in line 4 by means of a heat exchanger 7 before being introduced into a stripper 8 (which may also be called a regeneration column) where the rich absorbent is stripped by a countercurrent flow of steam. The stripping steam is generated in a reboiler 11 in which lean absorbent collected at the bottom of the stripper 8 is introduced through a lean absorbent withdrawal pipe 10. Heat for steam production in the reboiler 11 is added by means of steam introduced in steam pipe 13; the steam in pipe 13 is condensed in the reboiler 11 and is withdrawn through condensate pipe 13'.

Lean absorbent is withdrawn from the reboiler 11 in stream 10 and recycled back into the stripper 8 in stream 12. Steam and $CO_2$ liberated from the absorbent in the stripper 8 is washed in not shown washing sections by a countercurrent flow of water, before being withdrawn through $CO_2$ collection pipe 9. The $CO_2$ and steam is cooled in a cooler 14, separated in a lean flash tank 15 to give water that is recycled into the stripper 8 through a recycling line 17, and partly dried $CO_2$ that is withdrawn through a pipe 16 for further treatment or use.

The process configuration illustrated in FIG. 1 includes several elements that can result in energy savings, including when the solvent described herein is used with the system 100. The overall energy requirements for the system 100 are based on the combined energy input for several components, principally the reboiler 11. The energy requirements for the steam used in the reboiler 11 (i.e. reboiler duty) may be reduced based on the compounds used in the solvent. The reduction in the total system energy may be due to a number of effects including an increased solubility of the carbon dioxide within the solvent described herein.

Overall, it is expected that the use of the solvent comprising AP and DMAMP can have a combined reduction in the total energy consumption when compared to the use of a carbon dioxide removal system using a solvent with similar compounds at similar ratios.

For use in the solvent described above in FIG. 1, a solvent has been identified comprising water, AP, and DMAMP. This specific mixture of compounds exhibits properties that are unexpected, relative to the properties of similar compounds or of pure DMAMP or pure AP. The use of this specific mixture of compounds in a solvent such as the one described in FIG. 1 would result in an unexpected reduction in energy consumption for the overall system 100.

Figure 2:
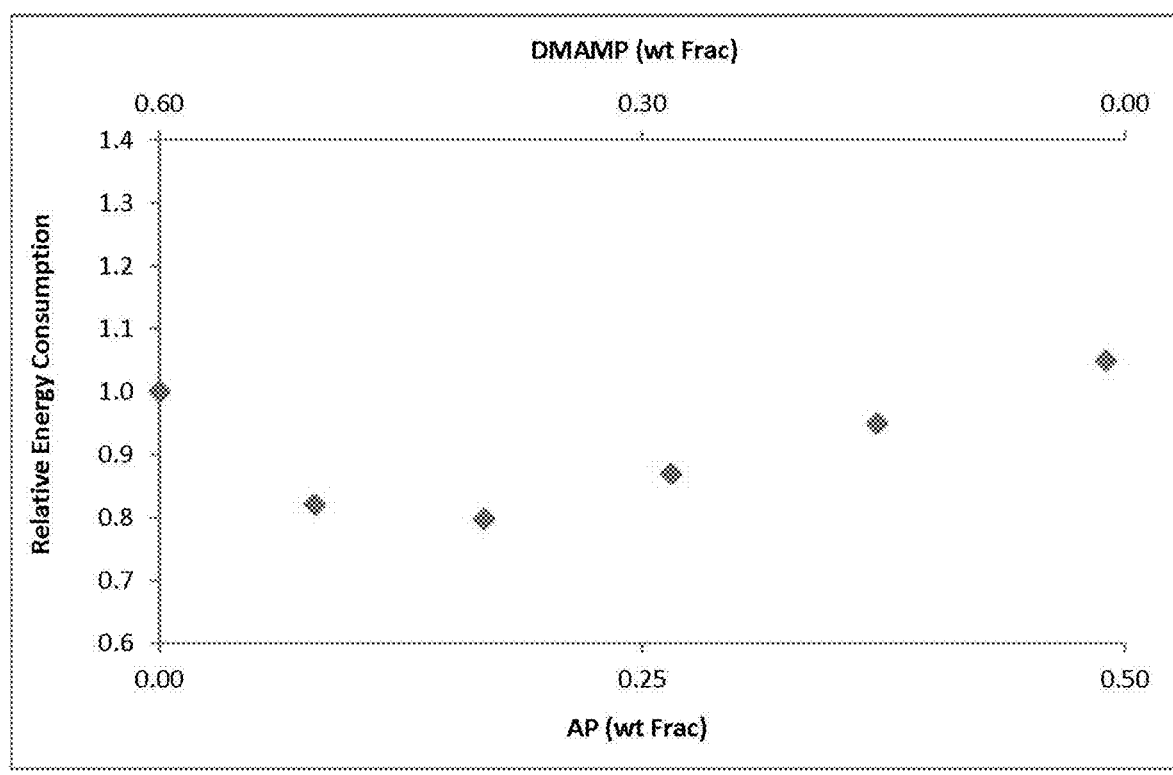
FIG. 2 illustrates the effect of the solvent composition on the total energy consumption according to an embodiment.

As shown in the example of FIG. 2, vapor-liquid equilibrium, kinetic, and physical property data were developed for solvents composed of AP, DMAMP, water, and mixtures thereof. The data indicate that mixtures of the components yield a solvent with lower energy consumption than either pure component. In FIG. 2, the energy consumption (i.e. reboiler duty) is plotted against the solvent composition. From left to right on the x-axis, the AP concentration increases and the DMAMP concentration decreases. The molality of the solvent mixture is constant. The relative energy consumption is plotted on the y-axis. The relative energy consumption is the reboiler duty divided by the $CO_2$ production rate, which is then normalized relative to the energy consumption of a pure AP and water solution. The energy consumption may be affected by the $CO_2$ loading of the rich and lean solvents (or delta loading).

One would have expected the energy consumption of a pure component to be the lowest energy consumption and the energy consumption of mixtures to be between the pure components. However this is not the case as improvements in energy consumption are achieved unexpectedly by mixing AP with DMAMP in water. FIG. 2 shows that the energy consumption is a minimum at a specific mixture ratio. However, a decreased energy consumption can be achieved when the solvent comprises between approximately 5% AP and approximately 45% AP, and between approximately 5% DMAMP and approximately 55% DMAMP, with the remainder of the solvent comprising water.

The components within the solvent may be at a number of ratios to one another to achieve this unexpected reduction in energy consumption. The ratio of AP to DMAMP within the solvent may be between 1:11 and 5:1. As a first example, the ratio of AP to DMAMP within the solvent may be approximately 1:10. As a second example, the ratio of AP to DMAMP within the solvent may be approximately 1:5. As a third example, the ratio of AP to DMAMP within the solvent may be approximately 1:4. As a fourth example, the ratio of AP to DMAMP within the solvent may be approximately 1:2. As a fifth example, the ratio of AP to DMAMP within the solvent may be approximately 1:1. As a sixth example, the ratio of AP to DMAMP within the solvent may be approximately 2:1. As a seventh example, the ratio of AP to DMAMP within the solvent may be approximately 3:1.

Another way of describing the components within the solvent may be as a percentage of the total solvent. For example, the AP within the solvent may be between 5 wt % and 45 wt % of the total solvent, and the DMAMP within the solvent may be between 5 wt % and 55 wt % of the total solvent. As a first example, the solvent may comprise approximately 5 wt % AP and approximately 55 wt % DMAMP. As a second example, the solvent may comprise approximately 10 wt % AP and approximately 45 wt % DMAMP. As a third example, the solvent may comprise approximately 12 wt % AP and approximately 40 wt % DMAMP. As a fourth example, the solvent may comprise approximately 20 wt % AP and approximately 35 wt % DMAMP. As a fifth example, the solvent may comprise approximately 30 wt % AP and approximately 30 wt % DMAMP. As a sixth example, the solvent may comprise approximately 30 wt % AP and approximately 25 wt % DMAMP.

As shown in FIG. 2, the energy consumption decreases at least approximately 20% from the energy consumption at the pure components. "Pure" components may be defined as a solution containing only that component and water. In some embodiments, the energy consumption decreases approximately 25% from the energy consumption at the pure components. The energy consumption decreases at least between approximately 0.6 GJ/t to approximately 1 GJ/t over the range of ratios of the compounds. The reduction in energy consumption may be optimized by selecting a specific ratio of AP and DMAMP. Additionally, the specific combination of AP with DMAMP in the solvent results in this unexpected decrease in energy consumption, where similar compounds at similar ratios do not result in a decrease in energy consumption.

In some embodiments of the system, the energy consumption of the system when a solution containing AP, DMAMP, and water is used may decrease between approximately 10% and 35% from the energy consumption of the system when the solution contains only AP and water. In some embodiments of the system, the energy consumption of the system when a solution containing AP, DMAMP, and water is used may decrease between approximately 20% and 30% from the energy consumption of the system when the solution contains only AP and water. In some embodiments of the system, the energy consumption of the system when a solution containing AP, DMAMP, and water is used may decrease approximately 25% from the energy consumption of the system when the solution contains only AP and water.

In some embodiments of the system, the energy consumption of the system when a solution containing AP, DMAMP, and water is used may decrease between approximately 10% and 30% from the energy consumption of the system when the solution contains only DMAMP or AP, and water. In some embodiments of the system, the energy consumption of the system when a solution containing AP, DMAMP, and water is used may decrease between approximately 15% and 25% from the energy consumption of the system when the solution contains only DMAMP and water. In some embodiments of the system, the energy consumption of the system when a solution containing AP, DMAMP, and water is used may decrease approximately 23% from the energy consumption of the system when the solution contains only DMAMP and water.

Having described various systems and methods, various embodiments can include, but are not limited to:

In a first embodiment, a solvent for capture of carbon dioxide from a gas mixture may comprise AP, in a concentration ranging from 5 wt % to 45 wt %; DMAMP, where a mass ratio of DMAMP to AP is between about 1:11 and 5:1; and water.

A second embodiment can include the solvent of the first embodiment, wherein the concentration of DMAMP is between approximately 10 wt % and 55 wt %.

A third embodiment can include the solvent of the first or second embodiments, wherein the concentration of AP is approximately 10 wt % and the concentration of DMAMP is approximately 45 wt %.

A fourth embodiment can include the solvent of any of the first to third embodiments, wherein the ratio of AP to DMAMP is approximately 1:10.

A fifth embodiment can include the solvent of any of the first to fourth embodiments, wherein the ratio of AP to DMAMP is approximately 1:5.

A sixth embodiment can include the solvent of any of the first to fifth embodiments, wherein the ratio of AP to DMAMP is approximately 1:2.

A seventh embodiment can include the solvent of any of the first to sixth embodiments, wherein the ratio of AP to DMAMP is approximately 1:1.

An eighth embodiment can include the solvent of any of the first to seventh embodiments, wherein the ratio of AP to DMAMP is approximately 3:1.

In a ninth embodiment, a method for capturing carbon dioxide from a gas mixture may comprise contacting a gaseous stream comprising carbon dioxide with a lean solvent, wherein the lean solvent comprises AP, DMAMP, and water; absorbing at least a portion of the carbon dioxide in the lean solvent to produce a rich solvent; transferring the rich solvent to a stripper, wherein the stripper comprises a reboiler; applying heat to the rich solvent using the reboiler; generating a vapor stream within the reboiler while incurring an energy consumption to regenerate the lean solvent, wherein the vapor stream comprises steam and at least a portion of the carbon dioxide from the rich solvent; and transferring the vapor stream to a condenser.

A tenth embodiment can include the method of the ninth embodiment, wherein a heat duty of the condenser is reduced relative to a corresponding method in which the solvent does not include the combination AP and DMAMP, and reducing the heat duty of the reboiler relative to a corresponding process in which the solvent does not include the combination of AP and DMAMP.

An eleventh embodiment can include the method of the ninth or tenth embodiment, wherein the energy consumption of the method is reduced by at least 10% relative to a corresponding process in which the solvent does not include the combination of AP and DMAMP.

A twelfth embodiment can include the method of any of the ninth to eleventh embodiments, wherein the lean solvent comprises a ratio of AP to DMAMP between approximately 1:11 and 5:1.

A thirteenth embodiment can include the method of any of the ninth to twelfth embodiments, wherein the lean solvent comprises approximately 10 wt % AP and approximately 40 wt % DMAMP.

A fourteenth embodiment can include the method of any of the ninth to thirteenth embodiments, wherein absorbing at least a portion of the carbon dioxide in the lean solvent to produce a rich solvent does not form a precipitate.

A fifteenth embodiment can include the method of any of the ninth to fourteenth embodiments, further comprising generating a vapor stream by flashing the lean solvent from the reboiler in a lean flash tank; compressing the vapor stream from the lean flash tank; and reintroducing the compressed vapor to the stripper.

In a sixteenth embodiment, a system for carbon dioxide capture from a gas mixture may comprise a lean solvent comprising 3-amino-1-propanol (AP), 2-dimethylamino-2-methyl-1-propanol (DMAMP), and water; an absorber containing at least a portion of the lean solvent, wherein the absorber is configured to receive the lean solvent and a gaseous stream comprising carbon dioxide, contact the lean solvent with the gaseous stream, and produce a rich solvent stream and a gaseous stream depleted in carbon dioxide; a stripper, wherein the stripper is configured to receive the rich solvent stream; a cross-exchanger fluidly coupled to a rich solvent outlet on the absorber and a rich solvent inlet on the stripper; a reboiler fluidly coupled to a lower portion of the stripper, wherein the reboiler is configured to generate a vapor stream from the rich solvent and pass the vapor stream back to the stripper; and a condenser fluidly coupled to a vapor outlet of the stripper.

A seventeenth embodiment can include the system of the sixteenth embodiment, wherein the lean solvent comprises approximately 5 wt % to 45 wt % AP and approximately 5 wt % and 55 wt % DMAMP.

An eighteenth embodiment can include the system of the sixteenth or seventeenth embodiments, wherein a ratio of DMAMP to AP in the lean solvent is between about 1:11 and about 5:1.

A nineteenth embodiment can include the system of any of the sixteenth to eighteenth embodiments, wherein the ratio of AP to DMAMP in the lean solvent is approximately 1:5.

A twentieth embodiment can include the system of any of the sixteenth to nineteenth embodiments, further comprising a flash tank fluidly coupled to the reboiler, wherein the flash tank is configured to receive an outlet stream from the reboiler and generate the lean solvent stream and a vapor stream consisting mainly of steam; and a vapor compressor fluidly coupled to the flash tank, wherein the vapor compressor is configured to receive and compress the vapor stream and pass the compressed vapor stream back to the stripper.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for carbon dioxide capture from a gas mixture, the system comprising:
    a lean solvent comprising 3-amino-1-propanol (AP), 2-dimethylamino-2-methyl-1-propanol (DMAMP), and water;
    an absorber containing at least a portion of the lean solvent, wherein the absorber is configured to receive the lean solvent and a gaseous stream comprising carbon dioxide, contact the lean solvent with the gaseous stream, and produce a rich solvent stream and a gaseous stream depleted in carbon dioxide;
    a stripper, wherein the stripper is configured to receive the rich solvent stream;
    a cross-exchanger fluidly coupled to a rich solvent outlet on the absorber and a rich solvent inlet on the stripper;
    a reboiler fluidly coupled to a lower portion of the stripper, wherein the reboiler is configured to generate a vapor stream from the rich solvent and pass the vapor stream back to the stripper; and
    a condenser fluidly coupled to a vapor outlet of the stripper.

2. The system of claim 1, wherein the lean solvent comprises approximately 5 wt % to 45 wt % AP.

3. The system of claim 1, wherein the lean solvent comprises approximately 5 wt % and 55 wt % DMAMP.

4. The system of claim 1, wherein a ratio of DMAMP to AP in the lean solvent is between about 1:11 and about 5:1.

5. The system of claim 1, wherein the ratio of AP to DMAMP in the lean solvent is approximately 1:4.

6. The system of claim 1, wherein the concentration of AP is approximately 10 wt % and the concentration of DMAMP is approximately 40 wt %.

7. The system of claim 1, further comprising:
a flash tank fluidly coupled to the reboiler, wherein the flash tank is configured to receive an outlet stream from the reboiler and generate the lean solvent stream and a vapor stream; and
a vapor compressor fluidly coupled to the flash tank, wherein the vapor compressor is configured to receive and compress the vapor stream and pass the compressed vapor stream back to the stripper.

8. The system of claim 1, wherein a ratio of AP to DMAMP in the lean solvent is approximately 1:10.

9. The system of claim 1, wherein a ratio of AP to DMAMP in the lean solvent is approximately 1:5.

10. The system of claim 1, wherein a ratio of AP to DMAMP in the lean solvent is approximately 1:2.

11. The system of claim 1, wherein a ratio of AP to DMAMP in the lean solvent is approximately 1:1.

12. The system of claim 1, wherein a ratio of AP to DMAMP in the lean solvent is approximately 3:1.

13. A system for carbon dioxide capture from a gas mixture, the system comprising:
a lean solvent comprising 3-amino-1-propanol (AP), 2-dimethylamino-2-methyl-1-propanol (DMAMP), and water, and wherein a ratio of DMAMP to AP in the lean solvent is between about 1:11 and about 5:1;
an absorber containing at least a portion of the lean solvent, wherein the absorber is configured to receive the lean solvent and a gaseous stream comprising carbon dioxide, contact the lean solvent with the gaseous stream, and produce a rich solvent stream and a gaseous stream depleted in carbon dioxide;
a stripper, wherein the stripper is configured to receive the rich solvent stream; and
a reboiler fluidly coupled to a lower portion of the stripper, wherein the reboiler is configured to generate a vapor stream from the rich solvent and pass the vapor stream back to the stripper.

14. The system of claim 1, wherein the lean solvent comprises approximately 5 wt % to 45 wt % AP.

15. The system of claim 1, wherein the lean solvent comprises approximately 5 wt % and 55 wt % DMAMP.

16. The system of claim 1, wherein the ratio of AP to DMAMP in the lean solvent is approximately 1:4.

17. The system of claim 1, wherein the concentration of AP is approximately 10 wt % and the concentration of DMAMP is approximately 40 wt %.

18. The system of claim 1, further comprising:
a flash tank fluidly coupled to the reboiler, wherein the flash tank is configured to receive an outlet stream from the reboiler and generate the lean solvent stream and a vapor stream; and
a vapor compressor fluidly coupled to the flash tank, wherein the vapor compressor is configured to receive and compress the vapor stream and pass the compressed vapor stream back to the stripper.

19. The system of claim 1, wherein a ratio of AP to DMAMP in the lean solvent is approximately 1:10.

20. The system of claim 1, wherein a ratio of AP to DMAMP in the lean solvent is approximately 1:5.

* * * * *